(12) United States Patent
Wakita

(10) Patent No.: US 11,862,002 B2
(45) Date of Patent: Jan. 2, 2024

(54) DETECTION SYSTEM AND INFORMATION DISPLAY SYSTEM

(71) Applicant: Panasonic Intellectual Property Management Co., Ltd., Osaka (JP)

(72) Inventor: Naohide Wakita, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 546 days.

(21) Appl. No.: 17/118,651

(22) Filed: Dec. 11, 2020

(65) Prior Publication Data

US 2021/0104145 A1 Apr. 8, 2021

Related U.S. Application Data

(63) Continuation of application No. PCT/JP2019/039071, filed on Oct. 3, 2019.

(30) Foreign Application Priority Data

Nov. 8, 2018 (JP) .................................. 2018-210807

(51) Int. Cl.
| | |
|---|---|
| *G08B 21/12* | (2006.01) |
| *G01N 15/14* | (2006.01) |
| *G01V 11/00* | (2006.01) |
| *H04R 1/08* | (2006.01) |
| *H04R 27/00* | (2006.01) |

(52) U.S. Cl.
CPC ......... *G08B 21/12* (2013.01); *G01N 15/1404* (2013.01); *G01N 15/1429* (2013.01); *G01V 11/002* (2013.01); *H04R 1/083* (2013.01); *H04R 27/00* (2013.01)

(58) Field of Classification Search
None
See application file for complete search history.

(56) References Cited

U.S. PATENT DOCUMENTS

2023/0152652 A1\* 5/2023 Trikha .................. H10K 59/65
700/276

FOREIGN PATENT DOCUMENTS

| JP | 2012-052865 | | 3/2012 |
|---|---|---|---|
| JP | 2012-068067 | | 4/2012 |
| JP | 2012068067 A | \* | 4/2012 |

OTHER PUBLICATIONS

International Search Report of PCT application No. PCT/JP2019/039071 dated Nov. 26, 2019.

\* cited by examiner

*Primary Examiner* — Adolf Dsouza
(74) *Attorney, Agent, or Firm* — Wenderoth, Lind & Ponack, L.L.P.

(57) ABSTRACT

A detection system includes a microphone, and a detector. The microphone picks up the voice of a visitor. The detector has an opening. The detector collects a microparticle passing through the opening, and detects a predetermined infectious agent contained in the collected microparticle. The opening is disposed below and forward of the microphone so that, when the visitor faces the microphone, the opening is positioned below and forward of the visitor.

7 Claims, 6 Drawing Sheets

DETECTION SYSTEM AND INFORMATION DISPLAY SYSTEM

BACKGROUND

1. Technical Field

The present disclosure relates to a detection system that detects a bacterium, a virus, or other infectious agent expelled by a visitor visiting a facility, and an information display system that displays information related to a detection result of an infectious agent.

2. Description of the Related Art

There have been growing instances where influenza or other infectious diseases spread in nursing-care facilities; hospitals; or other places, causing deaths of the elderly who typically have a weak immune system. Further; growing transnational movement of people and goods has led to concern for potential pandemics of infectious diseases caused by unknown pathogens.

Against such a background, to reduce spread of severe infectious diseases such as influenza, techniques have been developed that collect airborne microparticles to detect a virus or other agent (see, for example, Japanese Unexamined Patent Application Publication No. 2012-052865). Further, techniques have been disclosed that collect air exhaled to a collection part, and detect a virus or other agent (see, for example, Japanese Unexamined Patent Application Publication No. 2012-068067).

SUMMARY

However; for the technique disclosed in Japanese Unexamined Patent Application Publication No. 2012-052865, it is desired to improve the speed and accuracy of detection; and for the technique disclosed in Japanese Unexamined Patent Application Publication No. 2012-068067, it is desired to reduce the burden on the visitor.

One non-limiting and exemplary embodiment provides a detection system that, in detecting an infectious agent expelled from the mouth of a visitor, makes it possible to reduce the burden on the visitor and improve the speed and accuracy of detection.

In one general aspect, the techniques disclosed here feature a detection system including a microphone, and a detector. The microphone picks up the voice of a visitor. The detector has an opening. The detector collects a microparticle passing through the opening, and detects a predetermined infectious agent contained in the collected microparticle. The opening is disposed below and forward of the microphone to, when the visitor faces the microphone, allow the opening to be positioned below and forward of the visitor.

According to an embodiment of the present disclosure, in detecting an infectious agent expelled from the mouth of a visitor, the burden on the visitor can be reduced, and the speed and accuracy of detection can be improved.

It should be noted that general or specific embodiments may be implemented as a system, a method, an integrated circuit, a computer program, a computer readable recording medium, or any selective combination thereof. Examples of computer readable recording media include non-volatile recording media such as a Compact Disc-Read Only Memory (CD-ROM).

Additional benefits and advantages of one aspect of the present disclosure will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
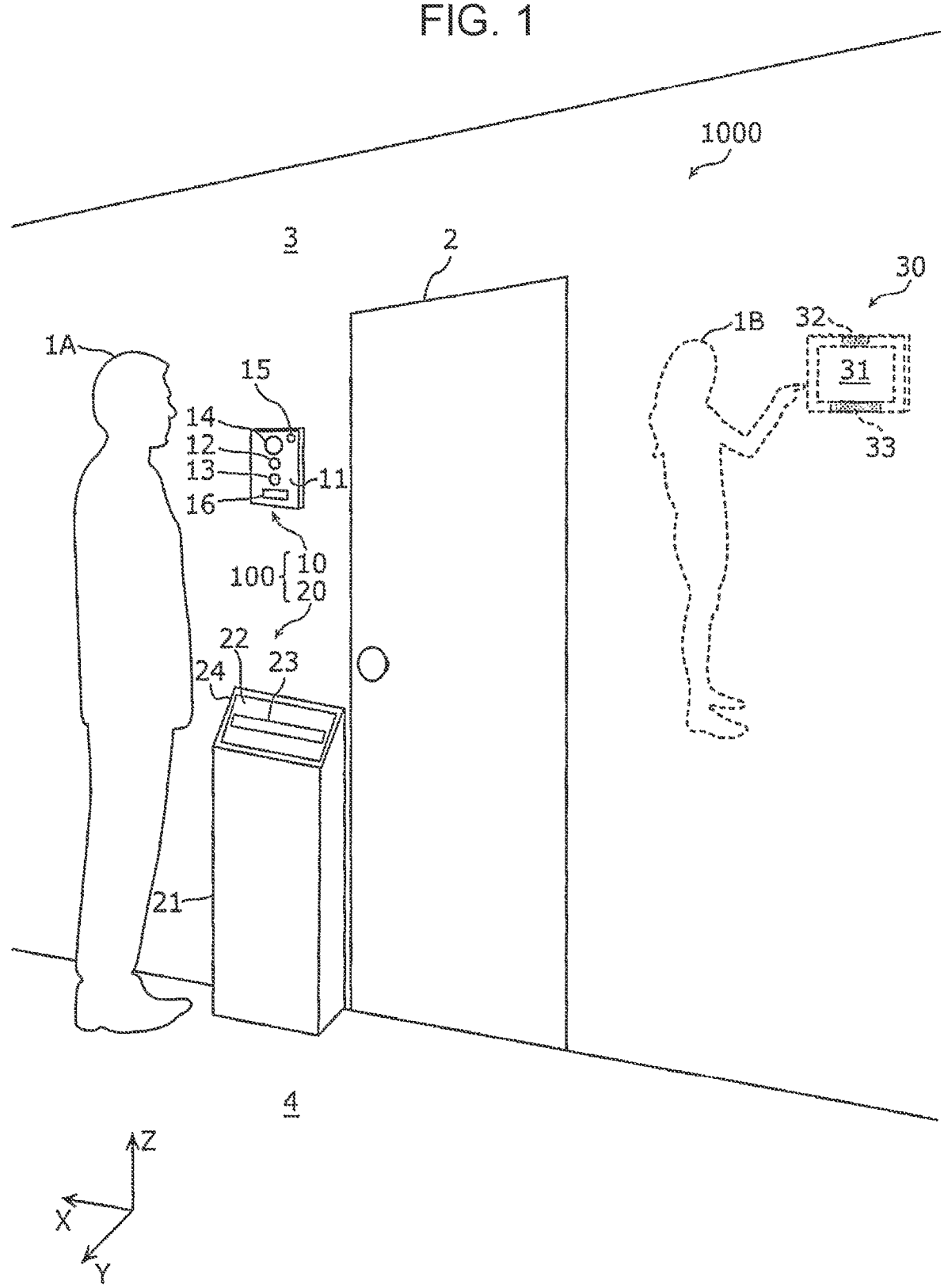
FIG. 1 illustrates an exemplary use of an information display system in accordance with Embodiment 1.

Underlying Knowledge Forming Basis of the Present Disclosure

Airborne infectious agents (e.g., a virus or a bacterium (to be referred to as virus or other agent hereinafter)) do not float alone but attach to other floating microparticles. For example, a virus or other agent is contained in droplets or other bodily fluids (e.g., saliva) expelled from a person and float in the air. Bodily fluids containing a virus or other agent is expelled out of the body of a person through coughing or sneezing. The smaller the expelled bodily fluids, the more rapidly the bodily fluids dry out and become droplet nuclei (i.e., microparticles). Droplet nuclei have small diameters of less than or equal to several μm.

Generally, the settling velocity of a particle is proportional to the square of its diameter. In air, a spherical particle with a diameter of 5 μm and a specific gravity of 1 has a settling velocity of about 5 cm/min. By contrast, a spherical particle with a diameter of 1 μm and a specific gravity of 1 has a very low settling velocity of about 12 cm/min. Therefore, microparticles containing a virus or other agent that is about 1 μm in diameter continues to float in the air for long periods of time, and further move around under the influence of air currents produced due to air conditioning or other causes.

Techniques for collecting a virus or other agent from such airborne microparticles have been developed. For example, Japanese Unexamined Patent Application Publication No. 2012-052865 discloses a technique that passes air through a filter capable of collecting a virus, and then extract a virus or other agent collected on the filter by use of an extraction liquid.

It is known that for a pathogen thriving in the respiratory tract, such as influenza, the RNA of the virus is contained not only in a cough or a sneeze but also in microparticles contained in exhaled air. Accordingly, techniques for collecting a virus in exhaled air have been also developed. For example, Japanese Unexamined Patent Application Publication No. 2012-068067 discloses a technique in which a subject is made to exhale air into the entrance of a cone-shaped tube to thereby suck and collect the exhaled air for detection of a virus or other agent contained in the exhaled air.

It is of note here, however, that in collecting an airborne virus or other agent as in Japanese Unexamined Patent Application Publication No. 2012-052865, the virus or other agent is dispersed and thus present at a reduced concentration. This means that to collect a virus or other agent in a short time, ambient air needs to be sucked at a high speed and in a large volume. The necessity for sucking air at a high speed and in a large volume leads to increased equipment size and noise.

The method according to Japanese Unexamined Patent Application Publication No. 2012-068067, which collects a virus or other agent from air exhaled to a collection part, allows for collection of a virus or other agent in a short time, leading to increased collection efficiency. However, the method requires the visitor to breath out with his or her mouth brought closer to or into contact with the collection part. Such a process may place stress on the visitor, or may be perceived as unhygienic.

One non-limiting and exemplary embodiment provides a detection system and an information display system that enable efficient collection of an infectious agent expelled from the mouth of a visitor to thereby reduce the burden on the visitor and improve the speed and accuracy of detection.

A detection system according to an aspect of the present disclosure includes a microphone, and a detector. The microphone picks up the voice of a visitor. The detector has an opening. The detector collects a microparticle passing through the opening, and detects a predetermined infectious agent contained in the collected microparticle. The opening is disposed below and forward of the microphone to, when the visitor faces the microphone, allow the opening to be positioned below and forward of the visitor.

This configuration helps to ensure that by disposing the opening below and forward of the microphone, the opening can be positioned below and forward of the visitor when the visitor faces the microphone. Therefore, droplets and microparticles that are expelled from the mouth of the visitor when the visitor speaks to the microphone can be efficiently collected through the opening. In other words, an infectious agent can be collected without the visitor becoming aware of an operation that is being performed to collect the infectious agent. This helps to reduce the burden on the visitor. Further, the infectious agent can be collected in the vicinity of the visitor as the visitor speaks. This leads to reduced collection time and consequently improved collection efficiency. As a result, the speed and accuracy of infectious agent detection can be improved.

For example, with the detection system according to an aspect of the present disclosure, the opening may be disposed at a distance of greater than or equal to 20 cm below the microphone.

This configuration allows the opening to be disposed at a distance of greater than or equal to 20 cm below the microphone. This makes it possible to improve the efficiency of infectious agent collection for cases where there are variations in the position of the visitor relative to the microphone.

For example, with the detection system according to an aspect of the present disclosure, the detector may further include a discharge outlet provided around the opening, a discharger that discharges air upward through the discharge outlet, and a sucker that sucks air through the opening.

This configuration makes it possible to discharge air upward through the discharge outlet, which is provided around the opening, to thereby create an air current directed from the discharge outlet toward the opening. Therefore, the fall velocity of droplets falling around the opening can be reduced to allow the droplets to dry, and the droplets that have thus become smaller or microparticles can be carried on an air current and directed toward the opening. In other words, an infectious agent can be collected with further improved efficiency.

For example, the detection system according to an aspect of the present disclosure may further include a human detecting sensor that detects the visitor, and in response to the detection of the visitor by the human detecting sensor, (i) the discharger may start the discharge, and (ii) the sucker may start the suction.

This configuration makes it possible to start the discharge and the suction in response to the detection of the visitor by the human detecting sensor. Therefore, an air current is allowed to stabilize before the visitor speaks to the microphone. Further, the discharge and the suction can be stopped when no visitor is present. This makes it possible to reduce the power consumption of the detector.

For example, the detection system according to an aspect of the present disclosure may further include an air blower that is disposed above the microphone and blows air toward the opening.

This configuration makes it possible to blow air toward the opening from above the microphone, thus allowing a downflow to be created in front of the microphone. Therefore, droplets and microparticles that are expelled from the mouth of the visitor can be efficiently directed toward the opening to thereby improve collection efficiency. Further, the opening can be disposed further below the microphone. This allows for increased freedom in terms of where to install the detector.

For example, the detection system according to an aspect of the present disclosure may further include a human detecting sensor that detects the visitor, and the air blower may start the blowing in response to the detection of the visitor by the human detecting sensor.

This configuration makes it possible to start blowing of air in response to detection of the visitor by the human detecting sensor. Therefore, a downflow can be created before the visitor speaks to the microphone. Further, blowing of air can be stopped when no visitor is present. This makes it possible to reduce the power consumption of the air blower.

For example, the detection system according to an aspect of the present disclosure may include an intercom including the microphone and a loudspeaker that outputs voice.

This configuration enables use of the detection system for an intercom.

An information display system according to an aspect of the present disclosure includes the detection system, and a display. The display receives information from the detector, and displays the received information, the information being related to a detection result of the predetermined infectious agent.

This configuration makes it possible to display, on the display, information related to a detection result. For example, a gate access manager can view such information displayed on the display to thereby prevent entry of an infected person into a controlled area.

Embodiments will be described below in more specific detail with reference to the drawings. Embodiments described below each represent a generic or specific example. Specific details set forth in the following description of embodiments, such as numeric values, shapes, materials, components, and the placement and connection of components, are for illustrative purposes only and not intended to limit the scope of the present disclosure. Among components described with reference to embodiments below, those components that are not cited in the independent claim representing the most generic concept of the present disclosure will be described as optional components. It is to be understood that the drawings are not necessarily to exact scale. In the drawings, substantially identical components are designated by the same reference signs to avoid or simplify repetitive description.

In the drawings below, the X-axis direction represents left and right. The positive Y-axis direction represents forward, and the negative Y-axis direction represents backward. The positive Z-axis direction represents upward, and the negative Z-axis direction represents downward.

Embodiment 1

Embodiment 1 will be described below.
Exemplary Use of Information Display System An exemplary use of an information display system according to Embodiment 1 will be described below in specific detail with reference to FIG. 1. FIG. 1 illustrates an exemplary use of an information display system in accordance with Embodiment 1. As illustrated in FIG. 1, an information display system 1000 according to Embodiment 1 is used to control access to a controlled area. A controlled area refers to an area for which entry by a person infected with a predetermined infectious disease (to be referred to as infected person) is to be restricted. Examples of controlled areas include nursing-care facilities and hospitals.

A visitor 1A presses a push button 16 of an intercom 10, which is installed on a wall 3 near a gate 2 at the entrance of a controlled area, to indicate his or her intention to visit the controlled area. When a reply from a gate access manager 1B is output via a loudspeaker 13, the visitor 1A speaks, for example, his or her name and/or the purpose of visit toward a microphone 12 of the intercom 10. The gate access manager 1B checks, on a display 30 installed inside the controlled area, the image of the visitor 1A captured by a camera 14.

Figure 2:
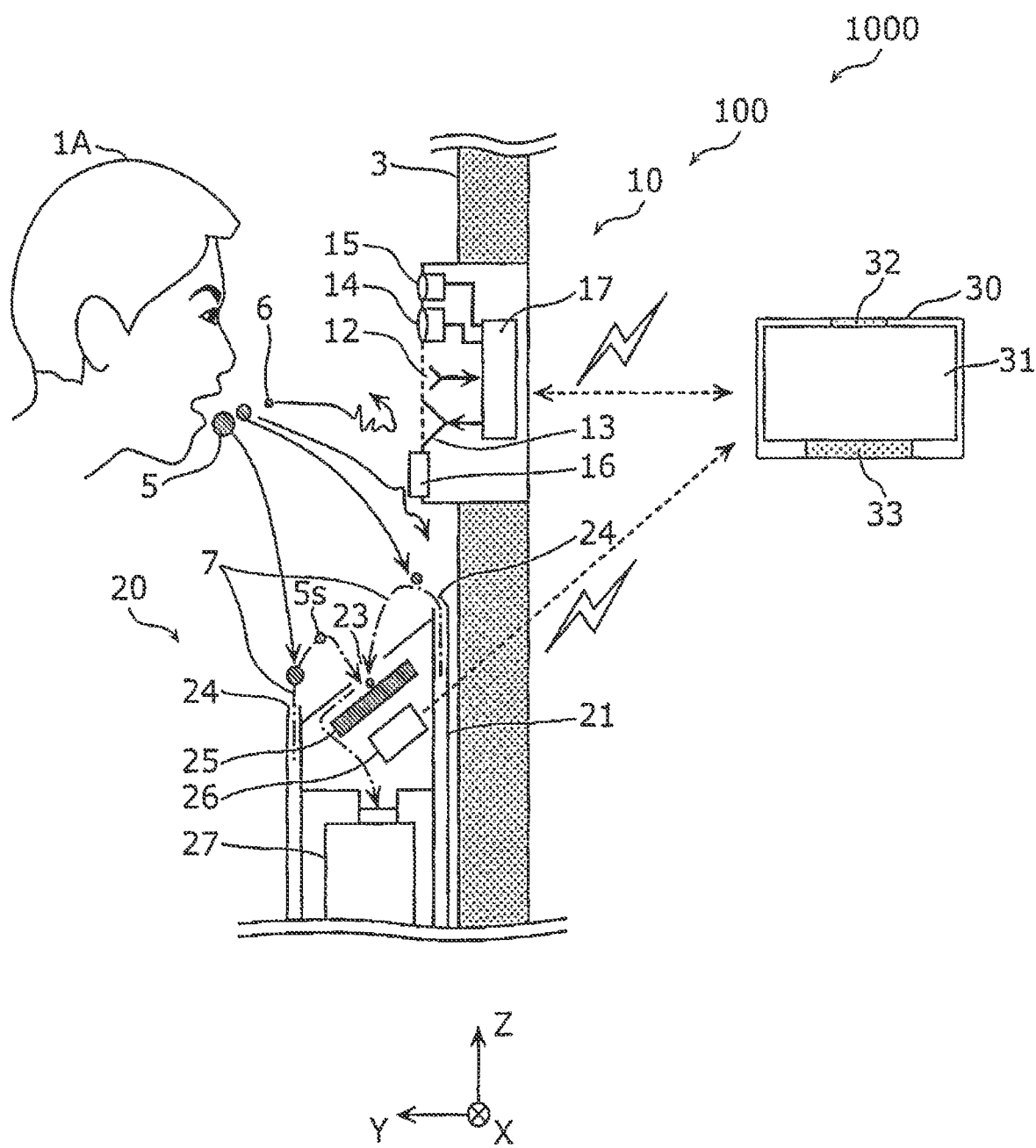
FIG. 2 is a schematic diagram of an information display system, illustrating the internal configuration of an intercom and the internal configuration of a detector in accordance with Embodiment 1.

In Embodiment 1, during such a normal exchange between the visitor 1A and the gate access manager 1B, the information display system 1000 collects, in a short time, microparticles expelled from the mouth of the visitor 1A, and detects a predetermined infectious agent contained in the collected microparticles. The information display system 1000 then provides the gate access manager 1B with information related to a detected infectious agent, and thus the entry of an infected person into the controlled area can be restricted.
Configuration of Information Display System With reference to FIGS. 1 and 2, specific reference will now be made to the configuration of the information display system 1000 according to Embodiment 1. FIG. 2 is a schematic diagram of the information display system, illustrating the internal configuration of an intercom and the internal configuration of a detector in accordance with Embodiment 1. As illustrated in FIGS. 1 and 2, the information display system 1000 includes a detection system 100, and the display 30. The detection system 100 includes the intercom 10, and a detector 20.
Configuration of Intercom The configuration of the intercom 10 will be described first. The intercom 10 is installed at the entrance of a controlled area, at a location where the visitor 1A can face the intercom 10. In Embodiment 1, the intercom 10 is installed on the wall 3 near the gate 2 at the entrance.

As illustrated in FIG. 1, the intercom 10 includes a front panel 11 provided with the following components; the microphone 12, the loudspeaker 13, the camera 14, a human detecting sensor 15, and the push button 16. As illustrated in FIG. 2, the intercom 10 includes an interface board 17 disposed inside the intercom 10.

The microphone 12 picks up the voice of the visitor 1A. When the visitor 1A speaks to the microphone 12, droplets 5 of saliva, and microparticles 6 are expelled from the mouth of the visitor 1A. The droplets 5 become microparticles 5s as the droplets 5 dry out. At this time, if the visitor 1A is infected with a predetermined infectious disease, the microparticles 5s and 6 expelled from the mouth of the visitor 1A contain a predetermined infectious agent.

A predetermined infectious agent refers to an infectious agent whose entry into a controlled area is desired to be reduced in order to prevent a person inside the controlled area from being infected with a predetermined infectious disease. One specific example of a predetermined infectious agent is an influenza virus.

The loudspeaker 13 outputs voice. For example, the loudspeaker 13 outputs the voice of the gate access manager 1B who is inside a controlled area, based on voice data received from the display 30 via the interface board 17.

The camera 14 includes an image sensor, and captures an image of the visitor 1A facing the intercom 10. For example, the camera 14 starts image capture when the push button 16 described later is pressed down. Image data captured by the camera 14 is transmitted to the display 30 via the interface board 17.

The human detecting sensor 15 detects the visitor 1A. The human detecting sensor 15 is, for example, an infrared sensor, an ultrasonic sensor, a visible light sensor, or a combination thereof. The human detecting sensor 15 detects a person present in the vicinity of the intercom 10. In response to detection of the visitor 1A, a detection signal is transmitted to the detector 20 via the interface board 17.

The push button 16 is a mechanical switch. For example, when the visitor 1A presses the push button 16, a chime sounds inside the controlled area, and image capture by the camera 14 is started.

The interface board 17 controls the microphone 12, the loudspeaker 13, and the camera 14, and communicates with the detector 20 and the display 30. For example, the interface board 17 determines whether the visitor 1A is present, based on an output signal from the human detecting sensor 15. In response to determining that the visitor 1A is present, the interface board 17 causes the camera 14 to start image capture, and transmits a signal indicative of the presence of the visitor 1A to the detector 20. The interface board 17 also transmits, to the display 30, image data captured by the camera 14, and voice data picked up by the microphone 12.

The interface board 17 may be a board with a dedicated electronic circuit mounted thereon. The interface board 17 may be a board including a processor and a memory. In this case, the processor on the interface board 17 implements various functions as the processor executes instructions stored in the memory.
Configuration of Detector The detector 20 detects a predetermined infectious agent contained in microparticles expelled from the mouth of the visitor 1A. The detector 20 includes a housing 21, which accommodates a capturing part 25, a sensor unit 26, and a pump 2T In Embodiment 1, the housing 21 has an upper surface 22 inclined forward and diagonally upward. The upper surface 22 has an opening 23, and a discharge outlet 24.

The opening 23 is oriented upward to collect the microparticles 6 and the droplets 5, which are expelled from the mouth of the visitor 1A speaking to the microphone 12, and the microparticles 5s, which are droplet nuclei produced as a result of the droplets 5 drying out. In Embodiment 1, the opening 23 is provided at substantially the center of the upper surface 22 and in a substantially rectangular shape, and is oriented forward and diagonally upward. A lid part may be provided at the opening 23 so that the opening 23 can be closed when there is no need to perform detection, such as when no visitor is present.

The expression "substantially the center" means to include, in addition to the center in a strict sense, a position that can be substantially regarded as the center. The expression "substantially rectangular shape" means to include, in addition to a rectangular shape in a strict sense, a shape that can be substantially regarded as rectangular. For example, a substantially rectangular shape may have a rounded corner. As for the location of the opening 23 within the detector 20 and the shape of the opening 23, the opening 23 may not necessarily be provided at substantially the center of the upper surface 22 and in a substantially rectangular shape.

As illustrated in FIG. 1, the opening 23 is disposed below and forward of the microphone 12, and on or above a floor 4. In other words, the opening 23 is positioned at a height above or equal to the floor 4 and below or equal to the microphone 12, and positioned forward of the microphone 12.

The discharge outlet 24 is provided around the opening 23. Specifically, the discharge outlet 24 is provided along the peripheral edges of the upper surface 22. In other words, the discharge outlet 24 is provided in such a way as to surround the opening 23.

The capturing part 25 captures the microparticles 5s and 6 entering through the opening 23. If a detection method is used that allows an infectious agent to be detected in air (e.g., fluorescence analysis using laser irradiation), a piece of glass coated with an adsorption layer may be used as the capturing part 25. If a detection method is used that allows an infectious agent to be detected in a liquid (e.g., various immunoassays using an antibody), a liquid pool may be used as the capturing part 25.

The capturing part 25 may include many capture regions that enable detection of an infectious agent to be performed multiple times. In this case, the capturing part 25 may preferably allow automatic movement of capture regions.

The sensor unit 26 detects a predetermined infectious agent from microparticles captured by the capturing part 25. Specifically, the sensor unit 26 detects the presence or absence of a predetermined infectious agent, or the concentration of a predetermined infectious agent. Information related to such a detection result is transmitted as electronic information to the display 30 in a wired or wireless manner.

To detect a predetermined infectious agent, an existing detection method may be used. In this regard, it may be possible to use a detection method that allows detection to be done in a short time, such as about several tens of seconds. An exemplary method that can be used to enable detection in a short time is fluorescence analysis. Another such exemplary method is an immunoassay using an antibody. In this case, for example, a method using magnetic nanoparticles modified with an antibody may be used. This method enables quick concentration and separation of an antigen-antibody conjugate by an external force induced by a magnetic field, thus allowing a predetermined infectious agent to be detected in a short time with high sensitivity.

The pump 27 is an exemplary sucker that sucks air through the opening 23, and an exemplary discharger that discharges air upward through the discharge outlet 24. The pump 27 creates a negative pressure within the housing 21 to suck air through the opening 23. Further, the pump 27 discharges air upward through the discharge outlet 24 provided around the opening 23. This creates an air current 7 that rises from the discharge outlet 24, and then falls toward the opening 23. As a result, movement of the droplets 5 toward the opening 23 is facilitated, which allows the droplets 5 to be collected over a wider area. The air current 7 leaving the discharge outlet 24 allows the fall velocity of the droplets 5 to decrease. For example, the air current 7 allows the fall velocity of the droplets 5 to decrease as the air current 7 ascends. The fall velocity of the droplets 5 can be also reduced as a result of the droplets 5 drying out and becoming smaller within the air current 7. This allows the droplets 5 to be easily carried on the air current 7 directed toward the opening 23. Therefore, as air is discharged upward through the discharge outlet 24 provided around the opening 23, the droplets 5 can be easily collected through the opening 23.

It takes a while for the air current 7 to stabilize. Accordingly, the pump 27 may, prior to the visitor 1A pressing the push button 16, be activated when the visitor 1A is detected by the human detecting sensor 15. In other words, the pump 27 may, in response to detection of the visitor 1A by the human detecting sensor 15, start discharge of air through the discharge outlet 24 and start suction of air through the opening 23.

Configuration of Display

The display 30 is capable of presenting the gate access manager 1B with the voice and image of the visitor 1A as well as information related to a detection result of an infectious agent. This allows the gate access manager 1B to remotely unlock the gate 2 if the visitor 1A is an uninfected person, and to remotely lock the gate 2 if the visitor 1A is an infected person.

As illustrated in FIGS. 1 and 2, the display 30 includes a display unit 31, a microphone 32, and a loudspeaker 33. The display 30 receives, from the detector 20, information related to a detection result of a predetermined infectious agent. Further, the display 30 may receive, from the intercom 10, image data of the visitor 1A captured by the camera 14.

The display unit 31 is, for example, a liquid crystal display unit or an organic EL display unit. The display unit 31 may be a touch screen. The display unit 31 displays information related to a detection result, which is received from the detector 20. Further, the display unit 31 may display image data of the visitor 1A received from the intercom 10.

Information related to a detection result refers to information related to a detected predetermined infectious agent. In one example, information related to a detection result may be information indicative of the presence/absence or amount of an infectious agent. In another example, information related to a detection result may be information indicative of whether the visitor 1A is an infected person, or information indicative of the probability of the visitor 1A being an infected person.

The gate access manager 1B in a controlled area may, based on information related to a detection result displayed on the display 30, remotely unlock the gate 2 at the entrance to the controlled area. Alternatively, the gate 2 at the entrance may be automatically unlocked by the display 30. In this case, the display 30 may be referred to as gate access controller.

The microphone 32 picks up the voice of the gate access manager 1B. The voice data picked up by the microphone 12 is transmitted to the intercom 10.

The loudspeaker 33 outputs voice. Specifically, the loudspeaker 33 outputs the voice of the visitor 1A based on voice data received from the intercom 10.

Location of Opening

An experiment is carried out by the inventor to investigate where to position the opening 23 so that microparticles expelled from the mouth of the visitor 1A when the visitor 1A speaks to the microphone 12 can be collected in a short time. The experiment will be described below with reference to FIGS. 3 to 4C.

Figure 3:
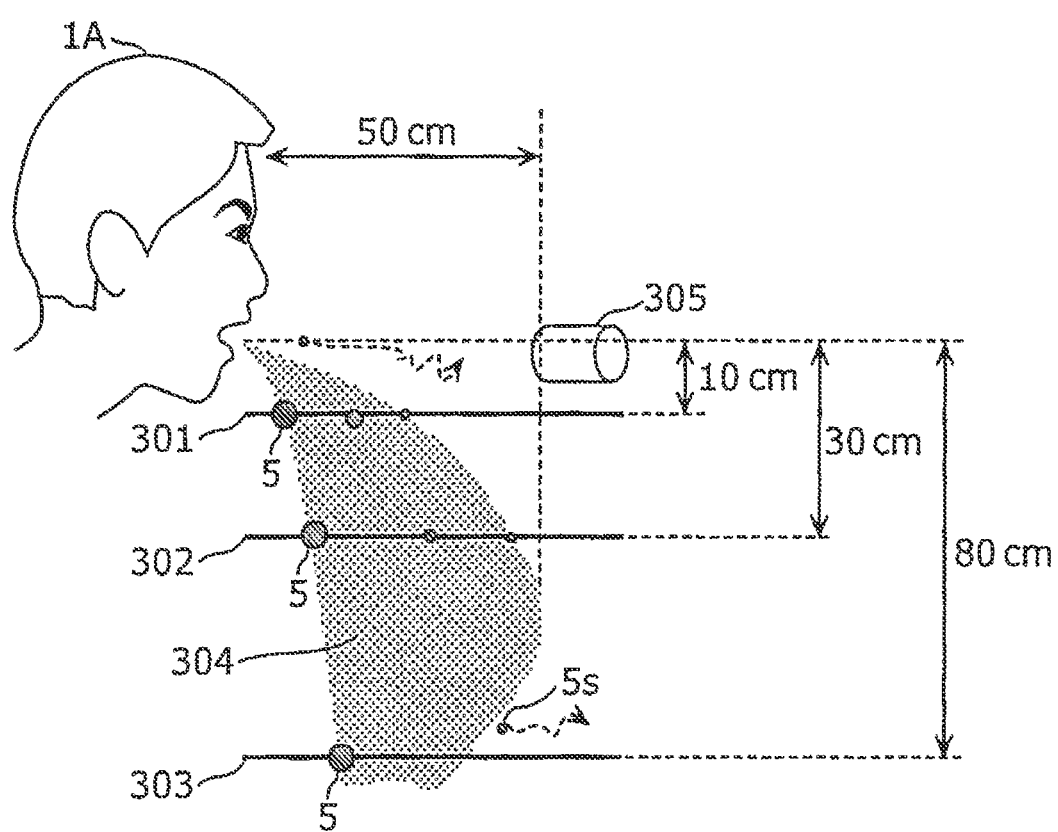
FIG. 3 illustrates, in vertical section, the distribution of an infectious agent expelled from the mouth of a subject.
Figure 4A:
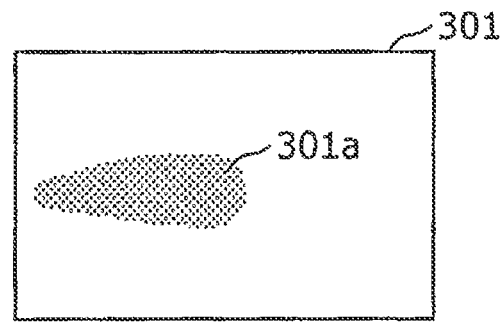
FIG. 4A illustrates the distribution of an infectious agent on a well plate placed at a height of 10 cm below the mouth.

FIG. 3 illustrates the distribution, in vertical section, of an infectious agent expelled from the mouth of a subject. FIG. 4A illustrates the distribution of the infectious agent on a first well plate placed at a height of 10 cm below the mouth. FIG. 43 illustrates the distribution of the infectious agent on a second well plate placed at a height of 30 cm below the mouth. FIG. 4C illustrates the distribution of the infectious agent on a third well plate placed at a height of 80 cm below the mouth.

In FIG. 3, a droplet distribution range 304 represents the distribution range of droplets expelled from the mouth of the visitor 1A. In FIG. 4A, a first bacterial distribution 301a represents bacterial distribution on a first well plate 301. In FIG. 43, a second bacterial distribution 302a represents bacterial distribution on a second well plate 302. In FIG. 4C, a third bacterial distribution 303a represents bacterial distribution on a third well plate 303.

The experiment is conducted with the subject being the visitor 1A who is a carrier of pneumococcus, which is a resident bacterium in the upper respiratory tract. In the experiment, as illustrated in FIG. 3, well plates each having a width of 30 cm and a length of 50 cm are placed one by one below and in front of the mouth of the subject.

Each well plate has microwell plates laid all over the plate. As such a microwell plate, a commercially available microwell plate for antigen-antibody reaction based on the ELISA technique is used. The microwell plate has wells arrayed at a pitch of 1 cm and each filled with 100 µL of phosphate buffer, with an antigen adsorbed on the bottom of each well.

With one of the well plates placed at the corresponding height, the subject is made to speak for 10 seconds while looking straight ahead. After the subject finishes speaking, the well plate is collected, and the next well plate is placed at a different height. The above-mentioned process of placement, speaking, and collection is repeated to thereby collect well plates placed at different heights, including the first well plate 301, the second well plate 302, and the third well plate 303.

An enzyme-labeled antibody to *Streptococcus pneumoniae* is added into each of these collected well plates for visual observation of bacterial distribution by using the ELISA method. This experiment is carried out on three subjects, and the mean of the planar distributions of the bacterium on each well plate is calculated.

Figure 4B:
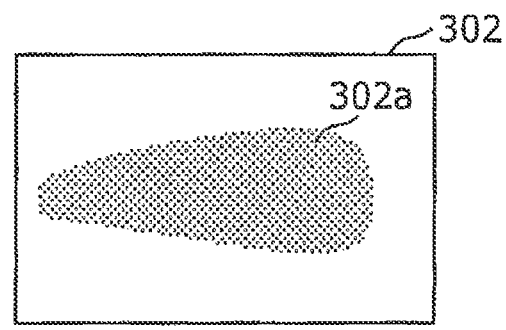
FIG. 4B illustrates the distribution of an infectious agent on a well plate placed at a height of 30 cm below the mouth.
Figure 4C:
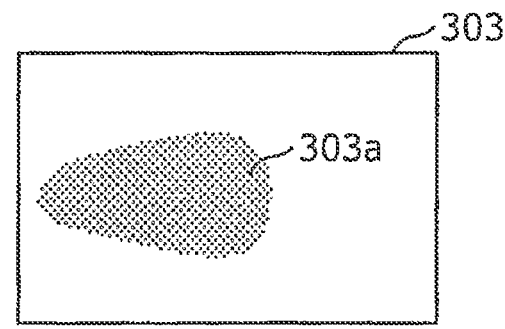
FIG. 4C illustrates the distribution of an infectious agent on a well plate placed at a height of 80 cm below the mouth.

As illustrated in FIG. 4B, for the second well plate 302 placed 30 cm below the mouth, the bacterium travels farthest, reaching a distance of about 40 cm from the mouth. By contrast, as illustrated in FIG. 4A, for the first well plate 301 placed 10 cm below the mouth, the droplets 5 containing the bacterium fall quickly on the first well plate 301, and thus the bacterium does not travel even 20 cm.

As illustrated in FIG. 4C, the bacterium reaches only a short distance also for the third well plate 303 placed 80 cm below the mouth. Presumably, this is because the droplets 5 dry out and become the microparticles 5s that stay afloat. Larger droplets greater than or equal to several tens of microns in diameter fall from the mouth in a parabola to a position near the subject in a short time, whereas slightly small droplets travel farther over longer periods of time. It is of note here, however, that particles travelling over longer periods of time dry out and become airborne during their travel, and thus do not reach the third well plate 303.

From these experimental results, the droplet distribution range 304 as illustrated in FIG. 3 is obtained, where the droplets 5 containing the bacterium can be collected as the visitor 1A speaks while looking straight ahead. The distance between the visitor 1A and the microphone 12 of the intercom 10 when the visitor 1A speaks varies with environment and from person to person. Accordingly, by providing the opening 23 at a position that is 30 to 50 cm below the microphone 12, the opening 23 can be disposed within an area where the droplets are distributed over a wide range. This helps to increase the probability of being able to collect droplets even if there are variations in the position where the visitor 1A speaks.

During speaking, the microparticles 6 are also expelled from the mouth in addition to the droplets 5. Accordingly, a collection experiment for microparticles is carried out by using a method used in related art for sucking airborne microparticles. In the experiment, as illustrated in FIG. 3, a commercially available air sampler 305 with a collection filter is installed at a distance of 50 cm directly in front of the subject. While the air sampler 305 sucks air, the subject speaks for 10 seconds, To prevent generation of noise that interferes with voice communication, the suction rate used is set to 1 L/min that allows only slight audible sound to be heard. After suction is performed for a predetermined amount of time, the microparticles on the filter are collected with phosphate buffer, and then ELISA is performed to detect the presence of any pneumococcus. It is found as a result that suction needs to be performed for at least five minutes to enable bacterial detection. The above-mentioned method of collecting air by suction according to related art thus fails to collect an infectious agent in a short time.

It is found from the above experimental results that, by positioning the opening 23 of the detector 20 below and forward of the intercom 10 as illustrated in FIGS. 1 and 2, microparticles contained in the droplets within the droplet distribution range 304 illustrated in FIG. 3 can be collected efficiently in a short time.

At heights within a range of greater than or equal to 0 cm and below or equal to 20 cm below the mouth, the horizontal travel distance of droplets is observed to be less than or equal to 30 cm. Accordingly, if the intercom 10 and the visitor 1A are 50 cm apart horizontally, which is a typical average horizontal distance, droplets are not successfully collected unless the opening 23 is disposed at a distance of greater than or equal to 20 cm forward of the intercom 10. However, if the detector 20 with the opening 23 disposed at a distance of greater than or equal to 20 cm forward of the intercom 10 is placed, it is difficult for the visitor 1A to bring his or her face closer to the intercom 10.

Therefore, the opening 23 may be disposed at a height that is within a distance range of greater than or equal to 20 cm and below or equal to 80 cm below the microphone 12. In another example, the opening 23 may be disposed at a height that is within a distance range of greater than or equal to 30 cm and below or equal to 50 cm below the microphone 12.

As for the horizontal position of the opening 23, the opening 23 may be disposed at any position that is forward of the intercom 10 and not obtrusive to the visitor 1A. For example, the opening 23 may be disposed at any position within a distance range of greater than or equal to 0 cm and below or equal to 50 cm forward of the intercom 10 (microphone 12). The angle at which the visitor 1A speaks toward the microphone 12 may vary depending on how tall the visitor 1A is. In this regard, droplets expelled out of the mouth of the visitor are projected toward the microphone 12 and then fall in a parabola under gravity, and thus the resulting distribution range of droplets is similar to the distribution range represented by the experimental results illustrated in FIG. 3.

As described above, the opening 23 of the detector 20 may preferably be disposed below and forward of the microphone 12, and on or above the floor 4. For example, the opening 23 may preferably be disposed within a range of greater than or equal to 20 cm and below or equal to 80 cm below the microphone 12.

The distance below the microphone 12 can be calculated with the vertically central position of the microphone 12 taken as the base point. The distance forward of the microphone 12 can be measured with the front side ((e.g., the front panel 11) of the microphone 12 taken as the base point.

Advantages or Other Effects

As described above, with the detection system 100 or the information display system 1000 according to Embodiment 1, the opening 23, which is oriented upward, can be disposed below and forward of the microphone 12, and on or above the floor 4. Therefore, droplets and microparticles that are expelled from the mouth of the visitor 1A when the visitor 1A speaks to the microphone 12 can be efficiently collected through the opening 23. In other words, an infectious agent can be collected without the visitor 1A becoming aware of an operation that is being performed to collect the infectious agent. This helps to reduce the burden on the visitor 1A. Further, the infectious agent can be collected in the vicinity of the visitor 1A as the visitor 1A speaks. This leads to reduced collection time and improved collection efficiency. As a result, the speed and accuracy of infectious agent detection can be improved.

With the detection system 100 or the information display system 1000 according to Embodiment 1, the opening 23 can be disposed at a distance of greater than or equal to 20 cm below the microphone 12. This makes it possible to improve the efficiency of infectious agent collection for cases where there are variations in the position of the visitor 1A relative to the microphone 12.

With the detection system 100 or the information display system 1000 according to Embodiment 1, air can be discharged upward through the discharge outlet 24, which is provided around the opening 23, to thereby create an air current directed from the discharge outlet 24 toward the opening 23. Therefore, the fall velocity of droplets falling around the opening 23 can be reduced to allow the droplets to dry, and the resulting droplets that have become smaller or microparticles can be carried on an air current and directed toward the opening 23. In other words, an infectious agent can be collected with further improved efficiency.

With the detection system 100 or the information display system 1000 according to Embodiment 1, the pump 27 is capable of starting discharge and suction of air when the visitor 1A is detected by the human detecting sensor 15. This allows an air current to stabilize before the visitor 1A speaks to the microphone 12. Further, discharge and suction of air can be stopped when the visitor 1A is not present. This makes it possible to reduce the power consumption of the detector 20.

With the information display system 1000 according to Embodiment 1, information related to a detection result can be displayed on the display. For example, the gate access manager 1B can view such information displayed on the display 30 to thereby prevent entry of an infected person into a controlled area. As a result, for example, it is possible to prevent a pathogen such as influenza from being brought into a facility.

Embodiment 2

Embodiment 2 is now described below. Embodiment 2 differs from Embodiment 1 above mainly in the presence of an air blower that blows air toward the opening from above the microphone. Embodiment 2 is now described below in specific detail with reference to FIG. 5, with the focus on differences from Embodiment 1 described above.

Configuration of Information Display System

Figure 5:
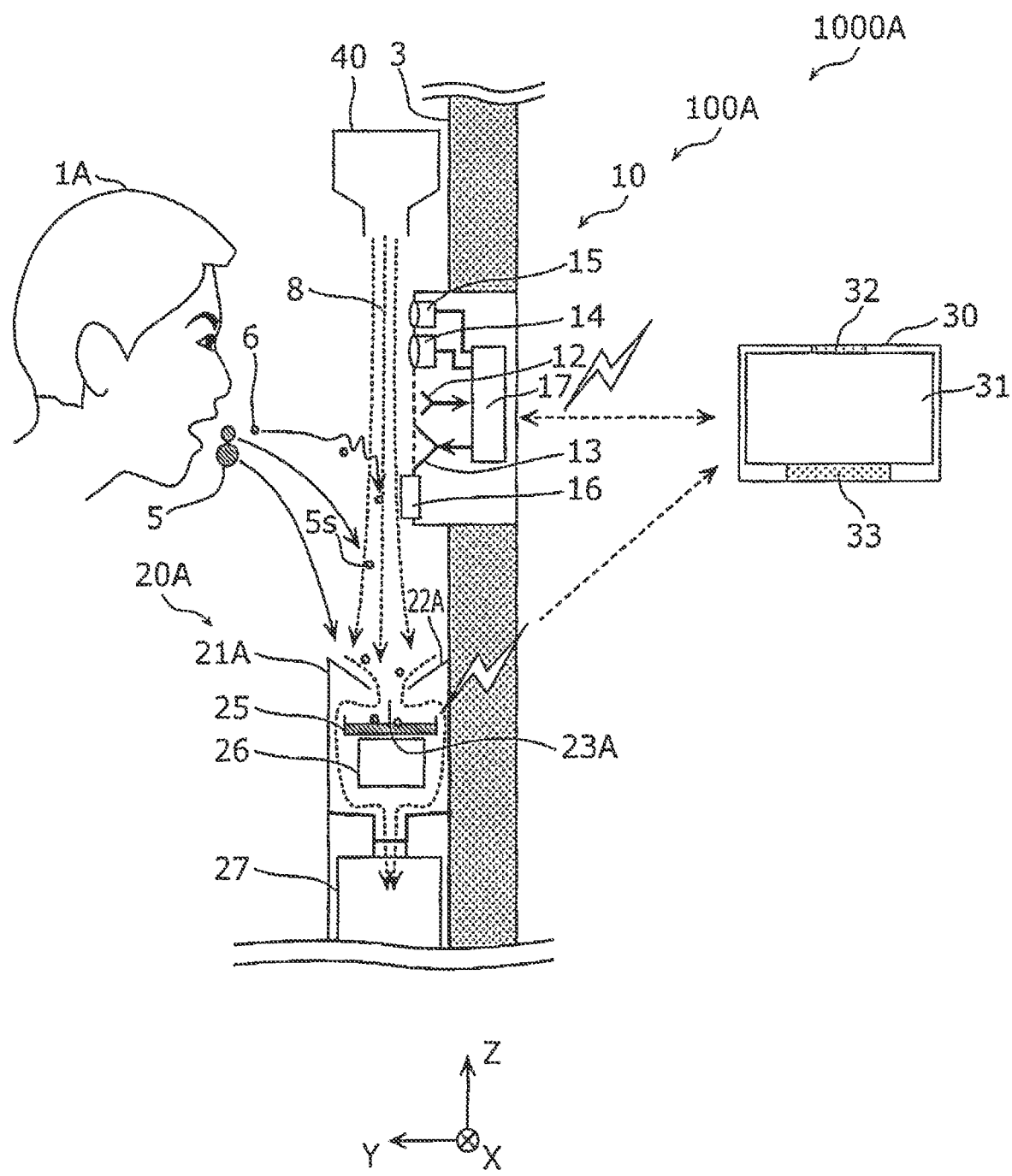
FIG. 5 is a schematic diagram of an information display system, illustrating the internal configuration of an intercom and the internal configuration of a detector in accordance with Embodiment 2.

FIG. 5 illustrates, in side view, the configuration of an information display system in accordance with Embodiment 2. An information display system 1000A according to Embodiment 2 includes a detection system 100A, the display 30, and an air blower 40. The detection system 100A includes the intercom 10, and a detector 20A.

Configuration of Detector

The detector 20A detects a predetermined infectious agent contained in microparticles expelled from the mouth of the visitor 1A. The detector 20A includes a housing 21A, which accommodates the capturing part 25, the sensor unit 26, and the pump 27. In Embodiment 2, the housing 21A has an upper surface 22A that slopes downward toward the substantially center position. An opening 23A is provided at substantially the center of the upper surface 22A.

The opening 23A is oriented upward to collect the microparticles 6 and the droplets 5, which are expelled from the mouth of the visitor 1A speaking to the microphone 12, as well as the microparticles 5s, which are droplet nuclei produced as a result of the droplets 5 drying out. In Embodiment 2, the opening 23A is provided at substantially the center of the upper surface 22A and in a substantially rectangular shape.

As with Embodiment 1, the opening 23A is disposed below and forward of the microphone 12, and on or above the floor 4. In other words, the opening 23A is positioned at a height above or equal to the floor 4 and below or equal to the microphone 12, and positioned forward of the microphone 12.

Configuration of Air Blower

The air blower 40 is installed above the intercom 10. The air blower 40 blows air toward the opening 23A of the detector 20A from above the intercom 10. The air blower 40 is thus capable of generating a downflow 8. As the downflow 8 passes in front of the microphone 12, not only the droplets 5 with high fall velocity but also the microparticles 6 are carried on the downflow 8 to pass through the opening 23A before being captured by the capturing part 25 provided inside the detector 20A.

The downflow 8 to be used may be a downflow with a velocity of about 0.1 to 1 m/sec. If the air blower 40 is installed at a position remote from the microphone 12, the influence of noise on the intercom 10 can be reduced.

The downflow causes the microparticles 5s and 6 to fall at accelerated velocity, which allows the opening 23A to be disposed further below in comparison to Embodiment 1. In other words, the opening 23A may be disposed at a distance of greater than or equal to 80 cm below the microphone 12. For example, the opening 23A may be disposed on the floor. In a manner similar to Embodiment 1, in order to provide a sufficient time for the air current to stabilize, the air blower 40 may be caused to, prior to the visitor 1A pressing the push button 16, generate a downflow when the visitor 1A is detected by the human detecting sensor 15. In other words, the air blower 40 may start blowing air in response to detection of the visitor 1A by the human detecting sensor 15.

Advantages or Other Effects

As described above, with the detection system 100A or the information display system 1000A according to Embodiment 2, air can be blown toward the opening 23A from above the microphone 12, and the downflow 8 can be thus created in front of the microphone 12. Therefore, droplets and microparticles that are expelled from the mouth of the visitor 1A can be efficiently directed toward the opening 23A to thereby improve collection efficiency. Further, the opening 23A can be disposed further below the microphone 12 in comparison to Embodiment 1. This allows for increased freedom in terms of where to install the detector 20A.

With the detection system 100A or the information display system 1000A according to Embodiment 2, the air blower 40 is capable of starting blowing of air in response to detection of the visitor 1A by the human detecting sensor 15. Therefore, the downflow 8 can be created before the visitor 1A speaks to the microphone 12. Further, blowing of air can be stopped when the visitor 1A is not present. This makes it possible to reduce the power consumption of the air blower 40.

Other Embodiments

Although the information display system and the detection system according to one or more aspects of the present disclosure have been described above with reference to their embodiments, the present disclosure is not limited to these embodiments. Rather, the present disclosure may include embodiments obtained by applying various modifications that may occur to persons skilled in the art to the above embodiments, or embodiments accomplished by combining components and functions in the above embodiments in any suitable manner, insofar as such combinations do not depart from the scope of the present disclosure.

Although the present disclosure has been described in sufficient detail with reference to the drawings by way of its preferred embodiments, various modifications and alterations are obvious to those skilled in the art. All such modifications and alterations not departing from the scope of the present disclosure as defined by the attached claims are intended to fall within the scope of the present disclosure.

For example, the camera 14 may transmit, in addition to a visible-light image, body temperature information obtained by an infrared thermograph to the display 30. The intercom 10 may include a display unit. The gate access manager 1B may not necessarily be a person but may be an automatic machine capable of intelligent judgment, such as artificial intelligence. The automatic machine may provide a message to the visitor 1A via a loudspeaker and/or a display unit. The automatic machine may instruct the visitor as to, for example, where to stand. The automatic machine may perform personal authentication based on an image and/or voice. The automatic machine may, via a network, perform acquisition and/or transmission of information related to the visitor 1A and information related to an infectious disease.

Although the foregoing description of the above embodiments is directed to the case where the detection system 100 includes the intercom 10, this is not intended to be limiting. For example, the detection system 100 may include a voice-based biometric authentication device instead of the intercom 10. In other words, it may suffice for the detection system 100 to include at least the microphone 12.

Figure 6:
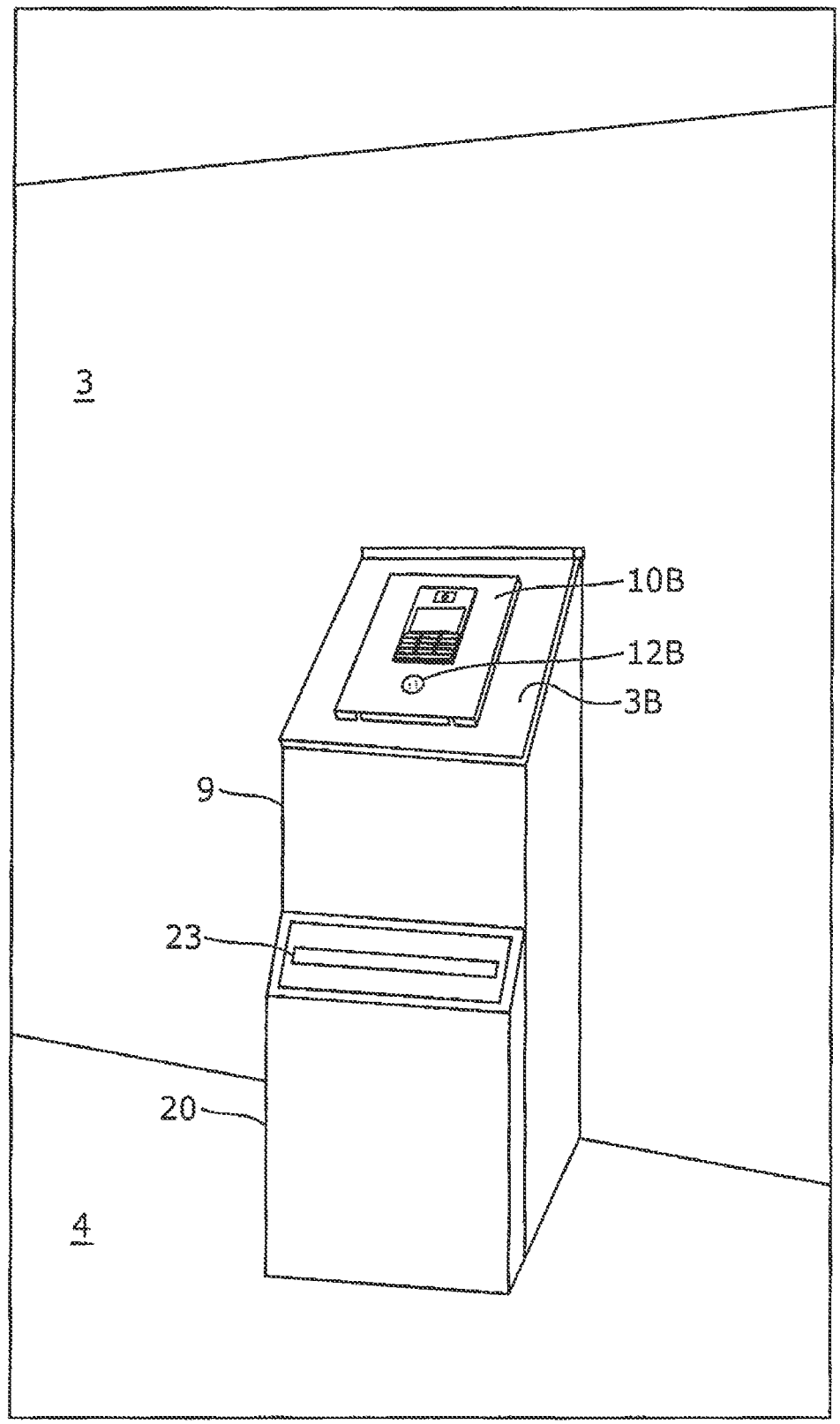
FIG. 6 illustrates the outward appearance of a detection system in accordance with another embodiment.

Although the foregoing description of the above embodiments is directed to the case where the intercom 10 is installed on the wall 3, this is not intended to be limiting. For example, as illustrated in FIG. 6, an intercom 10B may be installed on an upper surface 3B of a columnar part 9, which protrudes from the floor 4. In this case as well, the opening 23 of the detector 20 is disposed below and forward of a microphone 12B, and on or above the floor 4.

Although the foregoing description of the above embodiments is directed to the case where the opening 23 or 23A has a substantially rectangular shape, this is not intended to be limiting. For example, the opening 23 or 23A may have a circular, elliptical, oval, or polygonal shape. The detector 20 or 20A may include multiple openings.

Although the foregoing description of the above embodiments is directed to the case where the pump 27 is accommodated inside the housing 21 or 21A of the detector 20 or 20A, this is not intended to be limiting. For example, the pump 27 may be disposed outside the housing 21 or 21A of the detector 20 or 20A.

Although the foregoing description of the above embodiments is directed to the case where the detector 20 or 20A is placed on the floor 4, this is not intended to be limiting. For example, the detector 20 or 20A may be installed on the wall 3 above the floor 4.

Although the foregoing description of Embodiment 1 is directed to the case where the detector 20 discharges air through the discharge outlet 24, the detector 20 may not discharge air. In this case, the detector 20 may not include the discharge outlet 24 on the upper surface 22.

Although the foregoing description of Embodiment 2 is directed to the case where the detector 20A includes the pump 27, the detector 20A may not include the pump 27. In other words, the detector 20A may not suck air through the opening 23A.

According to another embodiment of the present disclosure, the detection system 100 includes a voice communicator, and a detector. The detector has an opening. The detector collects a microparticle passing through the opening, and detects a predetermined infectious agent contained in the collected microparticle. The opening is disposed below and forward of at least one portion of the voice communicator to, when the visitor faces the at least one portion of the voice communicator, allow the opening to be positioned below and forward of the visitor.

Specific examples of the above-mentioned voice communicator include an intercom placed at the entrance of a building or other location, and a face-to-face voice communicator placed at a location such as the immigration/emigration window of an airport or the ticket office of a train station.

According to another embodiment of the present disclosure, at least a portion of the voice communicator includes, for example, at least one of the following components constituting the voice communicator: a microphone, a loudspeaker, an operation button, and a camera that is attached to the voice communicator.

A detection system or an information display system according to an aspect of the present disclosure can be used for, for example, a gate access control system in a hospital, or a gate access control system in a nursing-care facility.

What is claimed is:

1. A detection system comprising:
a microphone that picks up a voice of a visitor; and
a detector that has an opening, the detector collecting a microparticle passing through the opening, the detector detecting a predetermined infectious agent contained in the collected microparticle, the opening being disposed below and forward of the microphone to, when the visitor faces the microphone, allow the opening to be positioned below and forward of the visitor,
wherein the detector further includes
a discharge outlet provided around the opening,
a discharger that discharges air upward through the discharge outlet, and
a sucker that sucks air through the opening.

2. The detection system according to claim 1, further comprising
a human detecting sensor that detects the visitor,
wherein in response to the detection of the visitor by the human detecting sensor,
(i) the discharger starts the discharge, and
(ii) the sucker starts the suction.

3. A detection system comprising:
a microphone that picks up a voice of a visitor;
a detector that has an opening, the detector collecting a microparticle passing through the opening, the detector detecting a predetermined infectious agent contained in the collected microparticle, the opening being disposed below and forward of the microphone to, when the visitor faces the microphone, allow the opening to be positioned below and forward of the visitor; and
an air blower disposed above the microphone, the air blower blowing air toward the opening.

4. The detection system according to claim 3, further comprising
a human detecting sensor that detects the visitor,
wherein the air blower starts the blowing in response to the detection of the visitor by the human detecting sensor.

5. A detection system comprising:
a microphone that picks up a voice of a visitor;
a detector that has an opening, the detector collecting a microparticle passing through the opening, the detector detecting a predetermined infectious agent contained in the collected microparticle, the opening being disposed below and forward of the microphone to, when the visitor faces the microphone, allow the opening to be positioned below and forward of the visitor;
an intercom including the microphone and a loudspeaker that outputs voice; and
an air blower disposed above the intercom, the air blower blowing air toward the opening.

6. A detection system comprising:
a voice communicator;
a detector that has an opening, the detector collecting a microparticle passing through the opening, the detector detecting a predetermined infectious agent contained in the collected microparticle, the opening being disposed below and forward of at least one portion of the voice communicator to, when the visitor faces the at least one portion of the voice communicator, allow the opening to be positioned below and forward of the visitor; and
an air blower disposed above the voice communicator, the air blower blowing air toward the opening.

7. An information display system comprising:
the detection system according to claim 6; and
a display that receives information from the detector, and displays the received information, the information being related to a detection result of the predetermined infectious agent.

* * * * *